(12) United States Patent
Spohn et al.

(10) Patent No.: US 10,561,990 B2
(45) Date of Patent: Feb. 18, 2020

(54) METHOD FOR PRODUCING ANTIFOULING COATINGS MADE OF THIN-LAYER COMPOSITE MEMBRANES FOR REVERSE OSMOSIS AND NANOFILTRATION

(71) Applicants: FRAUNHOFER-GESELLSCHAFT ZUR FÖRDERUNG DER ANGEWANDTEN FORSCHUNG E.V., München (DE); IAB IONENAUSTAUSCHER GMBH, Bitterfeld-Wolfen (DE)

(72) Inventors: Uwe Spohn, Halle (DE); Ulrike Hirsch, Halle (DE); Marco Rühl, Bitterfeld-Wolfen (DE); Nico Teuscher, Halle (DE); Andreas Heilmann, Augustusburg (DE); Carsten Schellenberg, Leipzig (DE)

(73) Assignees: Fraunhofer-Gesellschaft zur förderung der angewandten Forschung e.V., München (DE); IAB Ionenaustauscher GmbH, Bitterfeld-Wolfen (DE)

( * ) Notice: Subject to any disclaimer, the term of this patent is extended or adjusted under 35 U.S.C. 154(b) by 91 days.

(21) Appl. No.: 15/503,298

(22) PCT Filed: Aug. 12, 2015

(86) PCT No.: PCT/EP2015/068585
§ 371 (c)(1),
(2) Date: Feb. 10, 2017

(87) PCT Pub. No.: WO2016/023956
PCT Pub. Date: Feb. 18, 2016

(65) Prior Publication Data
US 2017/0225126 A1    Aug. 10, 2017

(30) Foreign Application Priority Data

Aug. 13, 2014 (EP) .................................... 14180835

(51) Int. Cl.
| | |
|---|---|
| *B01D 65/08* | (2006.01) |
| *B01D 67/00* | (2006.01) |
| *B01D 69/12* | (2006.01) |
| *B01D 71/30* | (2006.01) |
| *B01D 71/78* | (2006.01) |
| *B01D 61/02* | (2006.01) |

(52) U.S. Cl.
CPC .......... *B01D 65/08* (2013.01); *B01D 61/025* (2013.01); *B01D 61/027* (2013.01); *B01D 67/0037* (2013.01); *B01D 67/0093* (2013.01); *B01D 69/125* (2013.01); *B01D 71/30* (2013.01); *B01D 71/78* (2013.01); *B01D 2323/38* (2013.01); *B01D 2325/48* (2013.01)

(58) Field of Classification Search
None
See application file for complete search history.

(56) References Cited

U.S. PATENT DOCUMENTS

| | | | |
|---|---|---|---|
| 8,544,658 B2 | 10/2013 | Stenzel et al. | |
| 2002/0172780 A1* | 11/2002 | Halverson | A61L 2/14 427/569 |
| 2003/0168172 A1* | 9/2003 | Glukhoy | H01J 37/32082 156/345.28 |
| 2007/0251883 A1* | 11/2007 | Niu | B01D 61/025 210/653 |
| 2009/0162662 A1 | 6/2009 | Chang et al. | |
| 2009/0308804 A1 | 12/2009 | Cohen et al. | |
| 2010/0035074 A1* | 2/2010 | Cohen | B05D 1/62 428/500 |
| 2010/0240827 A1* | 9/2010 | Barwick | B05D 1/62 524/577 |
| 2011/0189469 A1 | 8/2011 | Stenzel et al. | |

FOREIGN PATENT DOCUMENTS

| | | |
|---|---|---|
| CA | 2732873 A1 | 2/2010 |
| CN | 101432058 A | 5/2009 |
| CN | 102112214 A | 6/2011 |
| CN | 103204977 A | 7/2013 |
| CN | 103752174 A | 4/2014 |
| EP | 2313184 B1 | 10/2012 |
| JP | 2009-535201 A | 10/2009 |
| JP | 2011103257 A * | 5/2011 |

(Continued)

OTHER PUBLICATIONS

Hirao, Takashi et al—JP2011103257 Machine Translation—Espacenet (Year: 2011).*
Saeki et al., "Anti-biofouling of polyamide reverse osmosis membranes using phosphorylcholine polymer grafted by surface-initiated atom transfer radical polymerization", *Desalination*, 350: 21-27 (2014).
European Patent Office, International Search Report and Written Opinion issued in International Application No. PCT/EP2015/068585 (dated Nov. 5, 2015).

(Continued)

*Primary Examiner* — Bradley R Spies
(74) *Attorney, Agent, or Firm* — Leydig, Voit & Mayer, Ltd.

(57) ABSTRACT

The invention relates to a combined method for gentle molecular surface functionalisation of the very thin, selectively-acting separating layer which preferably consists of aromatic polyamides, polyurethanes and/or polyureas, of thin-film composite membranes for reverse osmosis (hyperfiltration) and for nanofiltration, subsequently collectively termed water-filtration membranes, in order to achieve a passive antifouling effect without impairing the selectivity of the water-selective separating layer made of polyamides and the water-permeability of the membrane.

8 Claims, No Drawings

(56) References Cited

FOREIGN PATENT DOCUMENTS

| JP | 2011-529789 A | 12/2011 |
|----|---------------|---------|
| WO | WO 92/015637 A2 | 9/1992 |
| WO | WO 2007/127605 A2 | 11/2007 |
| WO | WO 2010/015599 A1 | 2/2010 |

OTHER PUBLICATIONS

International Bureau of WIPO, International Preliminary Report on Patentability issued in International Application No. PCT/EP2015/068585 (dated Feb. 14, 2017).
Japan Patent Office, Notification of Reasons for Refusal in Japanese Patent Application No. 2017-527975 (dated May 8, 2019).
State Intellectual Property Office of the People's Republic of China, Notice on the First Office Action in Chinese Patent Application No. 2015800431749 (dated Aug. 29, 2019).

* cited by examiner

METHOD FOR PRODUCING ANTIFOULING COATINGS MADE OF THIN-LAYER COMPOSITE MEMBRANES FOR REVERSE OSMOSIS AND NANOFILTRATION

CROSS-REFERENCE TO RELATED APPLICATIONS

This patent application is the U.S. national phase of International Application No. PCT/EP2015/068585, filed on Aug. 12, 2015, which claims the benefit of European Patent Application No. 14180835.2, filed Aug. 13, 2014, the disclosures of which are incorporated herein by reference in their entireties for all purposes.

The invention relates to a combined method for gentle molecular surface functionalisation of the very thin, selectively-acting separating layer which preferably consists of aromatic polyamides, polyurethanes and/or polyureas, of thin-film composite membranes for reverse osmosis (hyperfiltration) and for nanofiltration, subsequently collectively termed water-filtration membranes, in order to achieve a passive antifouling effect without impairing the selectivity of the water-selective separating layer made of polyamides and the water-permeability of the membrane.

Membrane-based processes for water treatment, e.g. in drinking water production, provision of industrial water and waste water purification or even in foodstuff- and biotechnology, in most cases operate in an unsterile or monoseptic way. Any microorganism present and accompanying biopolymers cause the formation of biofilms which are deposited on the membranes and in the pores thereof. As a result of the consequently produced biofouling, there is a reduction in the permeate flow, the separation selectivity and often the colonisation of resistant, possibly also pathogenic germs, complete destruction (disinfection) of which requires intensive use of disinfectants or antibiotics. The deposition of biopolymers, such as proteins, polysaccharides and nucleic acids, assists the formation of microbial biofilms and should be eliminated as far as possible or minimised as far as possible. All antifouling coatings and—functionalisations must preserve the technical function of the membrane. This is, for example in particular in the case of separating membranes, in particular of thin-film composite membranes for reverse osmosis, a technical requirement which is difficult to achieve. Furthermore, it is required that all antifouling measures can be integrated in existing production—and plant concepts.

In technical practice, the problem of membrane fouling, in particular of biofouling, is resolved by mechanical cleaning, washing, chemical disinfection and also chemical and superheated-steam sterilisation. At present antifouling measures which combine prefiltration (micro- and ultrafiltration), nutrient depletion (flocculation inter alia) and chemical membrane cleaning by alternate treatment with acidic and alkaline solutions and with aqueous solutions of chlorine, bonded active chlorine or hypochlorite, subsequently in brief, chlorine solutions, are favoured. The widespread use of chlorine solutions, because of roughening of the selective separating layer on reverse osmosis membranes which becomes ever more frequent during the total operating time, ultimately leads to destruction of the separating membrane. In most cases, all these procedures require interruption, of more or less length, of the technical processes, high use of disinfectant—and cleaning agents, antibiotics, energy and time. Ultimately, the separating membranes must be exchanged after a significantly shortened process time. Modifications to the membrane surfaces by wet-chemical methods, which are known to date, in fact lead to inhibition of the microorganism growth which leads to biofouling, to a reduction in microorganism adhesion and to a reduction in the adsorption of biopolymers, however not to complete elimination of the biofouling. Hydrolysis-, acid-, alkali- and oxidatively sensitive membrane layers, e.g. in the thin-film composite membranes used predominantly in reverse osmosis and obtaining desalinated water from brackish—and sea water, cannot be modified wet-chemically in a reactive solvent intermediate phase without great changes to the membrane properties or only with great restrictions. In order to produce membranes with antifouling properties, also controlled living graft polymerisation can be used. Controlled living graft polymerisation, which begins in initialisation groups polymerised in the membrane substance, such as e.g. in radical addition-fragmentation-chain-transfer polymerisation (RAFT), radical atom transfer polymerisation on bromine- and chloroalkyl groups and radical graft polymerisation mediated by nitroxide groups is known from WO2010/015599 A1, CA 2,732,873 A1,CN 102112214A, EP 2 313 184 A1, EP 2 313 184 B1, U.S. Pat. No. 8,544,658 B1, US 2011/0189469 A1. The disadvantage of controlled living graft polymerisation on wet-chemically pre-treated membrane surfaces resides in the expectedly greatly changed separating performance and permeability of thin-film composite membranes for reverse osmosis.

Starting herefrom, it was the object of the present invention to provide a method for the production of antifouling coatings of membranes, without the selectivity and the water permeability of the membrane being impaired.

This object is achieved by the features of the thin-film composite membrane and the uses thereof described herein. Advantageous developments according to the invention are also described.

According to the invention, a method for the production of antifouling coatings of membranes is provided, in which
in a first step, a primary molecular functionalisation of the membrane in the gas phase is effected by plasma-chemical activation, i.e. activation in the electrical direct voltage- or alternating voltage field, and/or photochemical activation of at least one halogen-organic compound which is convertible into the gas phase and covalent binding thereof to the membrane surface via the halogen groups and
in a second step, a wet-chemical modification of the membrane functionalised with halogen atom-derivatised molecular groups is effected by means of radical graft polymerisation.

The wet-chemical modification takes place in liquid phase, preferably in an aqueous-alcoholic and alcoholic solution. The method according to the invention hence enables the production of a water-filtration membrane with improved antifouling properties by means of the chemically adapted combination of a molecular functionalisation of the membrane surface by gas phase reaction with a radical graft polymerisation in the liquid phase.

The gentle molecular functionalisation of the membrane surface, preserving the membrane function, e.g. by the introduction of halogen-containing molecular groups by means of a plasma process, is thereby adapted chemically to the subsequently occurring polymerisation reaction. The actual antifouling effect is achieved by firm fixation of sufficiently densely-disposed and effective chemical groups by graft polymerisation.

For the molecular functionalisation in the gas phase, preferably halogen-organic compounds are used. These are preferably selected from the group consisting of allyl halides, $C_1$ to $C_8$ alkylene halides, preferably $C_1$ to $C_4$ alkylene halides, in particular methylene halides, $C_1$ to $C_8$ alkyl halides, preferably $C_1$ to $C_4$ alkyl halides, in particular methyl halides and mixtures hereof. Particularly preferred are propyl bromide, ethyl bromide, allyl bromide, allyl chloride, methylene bromide, methylene chloride, methyl bromide, methyl chloride and also mixtures hereof. It was surprisingly established thereby that, by using the halogen-organic compounds and deposition thereof from the gas phase, a very gentle modification of the sensitive membrane layers is possible. The plasma-chemical and/or photolytic activation whilst maintaining the functional groups to be derivatised chemically leads to deposition of these on the membrane. The covalent binding of the halogen-organic compound is thereby effected via the organic radicals, preferably via alkylene bridges, in particular methylene-, ethylene- and propylene groups.

The quantity of the halogen-organic, functional groups which are to be bound to the surface of the membrane to be modified is generally between 0.01 and 5 per square nanometre, preferably between 0.1 and 2 per square nanometre.

Furthermore, it is preferred that the halogen atoms of the halogen-organic compounds are split off photochemically or catalytically, in particular with Cu(I) complexes, Cu(II) complexes or Ru(III) complexes, whilst forming immobilised radicals, as a result of which a radical graft polymerisation, in particular a living atom-transfer polymerisation (ATRP) can be started with alkenes.

The living, controlled atom-transfer polymerisation is distinguished by the fact that the concentration of free radicals is lowered by the addition of a transition metal complex and in combination with an atom-transfer process with a halogen-organic compound until the chain breakage reactions are extensively suppressed. There is understood by a living polymerisation, polymerisations for which no breakage reaction exists. Under "living conditions", control of molar masses with a narrow distribution becomes possible.

The living, controlled atom-transfer polymerisation is preferably implemented in an aqueous-alcoholic solution, the alcohol preferably being selected from the group of methanol, ethanol, propanol, isopropanol, n-butanol and also mixtures hereof.

The reaction temperatures in the case of ATRP are preferably at temperatures of 10 and 80° C., preferably of 20 and 50° C.

The ATRP is effected preferably at normal pressure.

As transition metal complex in the case of ATRP, preferably copper(I) complexes, in particular CuBr, are used.

In the case of atom-transfer polymerisation, preferably oligomeric or polymeric substances, preferably orientated, are thereby bonded on the membrane. There are included herein, preferably polyacrylates, polymethacrylates and other polyvinyls which form layers which impede or prevent binding of biopolymers, preferably proteins, of humic acids and of microorganisms. Orientated means that the polymer chains, starting from surface-initiating, covalently bonded halogen atoms, preferably bromine- and chlorine atoms, polymerise up in a controlled manner orientated away from the membrane surface to be modified, i.e. grow and orientate themselves in a self-organising manner in this way, the density of the thus produced polymer brushes being determined via the density and arrangement of the halogen atoms and the polymer chain geometry. In the case of ATRP, the monomer molecules are shifted, during polymerisation, between the halogen atom and the growing polymer chain so that the former is always located at the end of the polymer chain and thus prescribes the direction of the polymerisation.

In the second step of the method according to the invention, there are used preferably, as monomers, 2-hydroxyethyl methacrylate (HEMA), 2-methacryloyloxyethyl phosphorylcholine (97%, MPC) or [2-(methacryloyloxy) ethyl] dimethyl-(3-sulfopropyl) ammonium hydroxide or mixtures of these compounds.

In general, bromine- and chlorine-organic compounds, preferably those in which the halogen atoms are bonded terminally to alkylene groups, can be used as initiators, preferably ethyl-α-bromoisobutyrate is used.

Preferably, the primary molecular functionalisation is implemented in the gas phase at atmospheric pressure, in particular in the pressure range of 100 to 1,000 mbar or in a vacuum, in particular in the pressure range of 0.01 mbar to 100 mbar, and temperatures in the range of 10 to 150° C., in particular of 20 to 50° C. The plasma can be produced by direct voltage-, alternating voltage-, high frequency- or microwave discharge or be implemented as electron cyclotron resonance plasma.

The membrane material or the material of the membrane surface is preferably selected from the group consisting of a polyurethane, a polyamide or a polyurea. These substrate materials preferably have a predominantly aromatic structure.

According to the invention, a thin-film composite membrane with at least one separating layer with a layer thickness in the range of 10 to 500 nm, made of a polyamide, polyurethane, polyurea or blends or mixtures hereof, at least one further polymer layer and also a polymeric carrier structure is likewise provided. The separating layer thereby has an antifouling coating as previously described. Preferably, the separating layer consists of an aromatic polyamide.

The thin-film composite membrane has a separating layer, preferably with a thickness in the range of 50 to 300 nm and at least one further polymer layer with a thickness in the range of 30 to 100 μm and a polymeric carrier structure with a thickness in the range of 50 to 100 μm.

The at least one separating layer is preferably modified with a terminal polymer chain density of 0.01 to 2 polymer chains, particularly preferably of 0.05 to 1 polymer chains, of the polyvinyls, polyacrylates and/or polymethacrylates produced by controlled growth polymerisation, without the separation properties and the permeability of the thin-film composite membrane being impaired by more than 20%.

The at least one further polymer layer comprises or essentially consists preferably of polysulfone, polyethersulfone, polyacrylonitrile, cellulose acetate, polyimide, polyether imide or combinations of these polymers as mixture or copolymer. Normally, also other asymmetrical membrane-forming polymers can however be used. Preferably, the at least one further polymer layer consists of polysulfone or polyethersulfone.

Preferably, the at least one carrier structure consists of a sieve mesh, a woven fabric, a porous layer or combinations hereof. These can be formed from a polyester, a polyamide, a polyolefin or another polymeric thread material. Preferably, the polymeric thread material consists of a polyester. Preferably, the carrier structure is a sieve mesh.

The membranes according to the invention are used in water treatment, in particular in drinking water production, provision of industrial water and waste water purification or in foodstuff- and biotechnology.

The advantages of the membranes produced according to the method according to the invention reside in the good antifouling properties with high separation performance and permeability. Particularly durable and selective membranes are therefore provided by the method according to the invention so that the membranes need no longer be replaced so frequently and consequently costs are reduced.

The subject according to the invention is intended to be explained in more detail with reference to the subsequent examples without restricting said subject to the specific embodiments illustrated here.

EXAMPLE 1

Functionalisation by Introducing Bromine-Containing Molecule Groups in the Gas Phase For the bromine functionalisation of reverse osmosis membranes in low pressure plasma, allyl bromide, bromoform and 1-bromopropane were used. The reverse osmosis membranes (for brackish water, high rejection) were provided by IAB Ionenaustauscher GmbH, LANXESS AG. For gentle bromine functionalisation of the membrane surface, the deposition of or modification with brominated hydrocarbons is effected from the low-pressure plasma. The membrane samples were fixed for this purpose on the lower of two plate electrodes (diameter: 150 mm, spacing: 100 mm) and the reaction chamber was sealed hermetically. Allyl bromide, bromoform or bromopropane were introduced via a needle valve after setting a negative pressure of 0.1 Pa until the desired process pressure of 2 to 4 Pa was reached. Ignition of the monomer gas was effected by applying a defined voltage in the range of 900-1,100 V to both electrode plates at 50 Hertz. The indicated process time corresponds to the duration for which a voltage was applied. Respectively 3 membrane samples of one thin-film composite membrane were modified with allyl bromide, bromoform or bromopropane at a voltage of 1,100 V and a process pressure of 4 Pa. Allyl bromide (99%, AB) was obtained from Alfa Aesar and used as obtained. The process duration was 5 seconds. Bromine was able to be detected on the thus coated or treated membranes by means of X-ray photon spectroscopy (XPS).

Table 1 shows the element composition close to the surface. The data were effected in atomic percentage [at %]. The deviations are standard deviations at 9 measuring positions on 3 parallel samples.

TABLE 1

| Sample | Br [at %] | C [at %] | N [at %] | O [at %] |
|---|---|---|---|---|
| untreated | — | 72.1 ± 0.41 | 10.4 ± 0.64 | 14.3 ± 0.65 |
| allyl bromide | 3.4 ± 1.18 | 73.0 ± 0.79 | 9.0 ± 0.88 | 11.4 ± 0.75 |
| bromoform | 1.6 ± 0.28 | 66.1 ± 0.75 | 11.3 ± 0.60 | 17.9 ± 0.51 |
| bromopropane | 4.2 ± 0.62 | 71.6 ± 0.58 | 8.6 ± 0.78 | 12.3 ± 0.91 |

There are between 1 and 5 bromine atoms for 100 atoms.

EXAMPLE 2

Radical Graft Polymerisation with Atom Transfer after the Molecular Functionalisation of the Membrane Surface The growth of oligomers or polymers on the membrane surface was effected by radical polymerisation with atom transfer (atom transfer radical polymerisation, ATRP) under exclusion of oxygen. The basic course of the method for the examples mentioned here is subsequently described. Copper (I)bromide (CuBr, purity>99.99%) and the ligand 2,2'-bipyridine (bpy, purity 99%, SigmaAldrich) were transferred into a Schlenk flask mixed in the desired quantity and degassed by repeated purging with nitrogen. Analogously, the respectively used monomer 2-hydroxyethylmethacrylate (99+%, HEMA), 2-methacryloyloxyethyl phosphorylcholine (97%, MPC) or [2-(methacryloyloxy) ethyl]dimethyl-(3-sulfopropyl) ammonium hydroxide (97%, SBMA) were transferred into a further Schlenk flask and degassed. Methanol (99.9% p.a.) and twice distilled water were filled into respectively a further vessel and likewise degassed. Subsequently, all vessels used were transferred via a lock into a fume hood box with an argon atmosphere (>99%). As next step, the production of reaction solution 1 was effected by dissolving the CuBr and the bpy in methanol. After complete dissolution by agitation, a dark-red reaction solution was obtained. Reaction solution 2 was produced by dissolving the monomer in water. Reaction solution 1 was now added to reaction solution 2 and agitated thoroughly for approx. 30 seconds. Subsequently, the free and dissolved initiator ethyl-α-bromoisobutyrate (98%, EBIB) was added and the resulting solution was agitated for approx. 30 seconds. The solution is placed in a reaction vessel designed especially for the membrane modification. The membrane samples were then either loosely stored or stretched in a differently designed reaction cell which enabled contacting only on one side of membrane samples cut out to be round (diameter approx. 75 mm) with the reaction solution. Temperature-control of the reaction was effected by transferring the reaction vessels into an air thermostat located in the interior of the fume hood box, in which the temperature was adjusted between 10 and 60° C. After expiry of the reaction time, the membrane samples were firstly rinsed carefully in a methanol-water mixture according to the ratio used for the reaction and subsequently in pure water. The samples were subsequently dried.

EXAMPLE 2.1

Poly-2-hydroxyethylmethacrylate (poly-HEMA) and poly[2-(methacryloyloxy) ethyl]dimethyl-(3-sulfopropane) (poly-SBMA) were polymerised up on membranes functionalised with allyl bromide. The concentrations of agents were 50 mmol/l HEMA or SBMA, 1 mmol/l EBIB, 1 mmol/l CuBr and 2 mmol/l bpy. A 9:1 mixture of water with methanol was used as solvent. The reaction duration was 1.5 h, 3 h and 20 h at 20° C. By means of XPS, an increase in the oxygen content (HEMA) or in the sulphur content (SBMA) of the membrane surface as a function of the reaction time was able to be measured.

Table 2 shows the surface composition of ATRP-modified membrane samples according to example 2.1. The data are in atomic percentage [at %]. The deviations are standard deviations from analyses implemented at 4 measuring positions.

TABLE 2

| Sample | Br [at %] | C [at %] | N [at %] | O [at %] | S [at %] |
|---|---|---|---|---|---|
| PHEMA 1.5 h | 0.2 ± 0.12 | 73.8 ± 0.35 | 8.9 ± 0.19 | 15.2 ± 0.19 | — |
| PHEMA 3 h | 0.1 ± 0.02 | 72.8 ± 0.26 | 7.3 ± 0.21 | 18.5 ± 0.37 | — |
| PHEMA 24 h | 0.2 ± 0.06 | 72.8 ± 0.12 | 6.6 ± 0.19 | 19.1 ± 0.17 | — |
| PSBMA 1.5 h | 0.6 ± 0.05 | 71.7 ± 0.76 | 8.8 ± 0.39 | 15.5 ± 0.54 | 2.2 ± 0.13 |

TABLE 2-continued

| Sample | Br [at %] | C [at %] | N [at %] | O [at %] | S [at %] |
|---|---|---|---|---|---|
| PSBMA 3 h | 0.5 ± 0.04 | 70.2 ± 0.34 | 7.8 ± 0.50 | 17.6 ± 0.77 | 2.9 ± 0.34 |
| PSBMA 24 h | 0.5 ± 0.06 | 67.8 ± 0.39 | 4.6 ± 0.21 | 22.1 ± 0.30 | 22.1 ± 0.30 |

EXAMPLE 2.2

Poly-2-methacryloyloxyethyl phosphorylcholine (poly-MPC) was polymerised up on membranes functionalised with bromoform (BF) or bromopropane (BP). 50 mmol/l MPC, 1 mmol/l EBIB, 1 mmol/l CuBr and 2 mmol/l bpy were added. A 1:1 mixture of water and methanol was used as solvent. The reaction duration was 2 h at 20° C.

By means of XPS, an increase in the phosphorus content of the membrane surface, which correlates with the quantity of polymerised monomers could be detected. Since the surface concentration of the available initialisation groups remains virtually constant, conclusions about the average polymerisation degree can also be drawn from the quantity of bonded phosphorus.

Table 3 shows the surface composition of ATRP-modified membrane samples according to example 2.2. The data are in atomic percentage [at %]. The deviations are standard deviations from analyses implemented at 3 measuring positions.

TABLE 3

| Sample | Br [at %] | C [at %] | N [at %] | O [at %] | S [at %] |
|---|---|---|---|---|---|
| PMPC (BF) | 1.1 ± 0.09 | 66.3 ± 0.94 | 7.9 ± 0.66 | 21.3 ± 0.04 | 2.5 ± 0.67 |
| PMPC (BP) | 1.6 ± 0.19 | 68.9 ± 0.48 | 7.0 ± 0.52 | 19.2 ± 1.01 | 2.2 ± 0.11 |

EXAMPLE 2.3

Poly-SBMA was polymerised up on membranes functionalised with allyl bromide. 50 mmol/l SBMA, 1 mmol/l EBIB, 1 mmol/l CuBr and 2 mmol/l bpy were used. In addition, 20 mmol/l glucose was added to the reaction solution as reduction agent. A 1:1 mixture of water and methanol was used as solvent. The reaction duration was 20 h. The reaction temperature was 20° C., 35° C. or 50° C. By means of XPS, an increase in the sulphur content of the membrane surface as a function of the reaction temperature could be detected, with which a measure of the achieved molecular weight of the grafted-on polymer chains was provided.

Table 4 shows the surface composition of ATRP-modified membrane samples according to example 2.3. The data are in atomic percentage [at %]. The indicated standard deviations are produced from the values measured at 3 positions on the membrane surface.

TABLE 4

| Sample | Br [at %] | C [at %] | N [at %] | O [at %] | S [at %] |
|---|---|---|---|---|---|
| PSBMA (20° C.) | 1.2 ± 0.02 | 68.2 ± 0.23 | 5.4 ± 0.11 | 21.3 ± 0.19 | 3.9 ± 0.05 |
| PSBMA (35° C.) | 1.1 ± 0.06 | 66.6 ± 0.23 | 4.7 ± 0.07 | 23.8 ± 0.18 | 4.5 ± 0.12 |
| PSBMA (50° C.) | 0.4 ± 0.32 | 67.0 ± 1.10 | 4.9 ± 0.14 | 22.S ± 0.81 | 5.2 ± 0.60 |

The invention claimed is:

1. A method for the production of antifouling coatings of thin-film composite membranes for reverse osmosis, nanofiltration, or ultrafiltration by modifying a membrane surface, in which
    in a first step, a primary molecular functionalisation of the membrane in the gas phase is implemented by plasma-chemical activation of at least one halogen-organic compound which is convertible into gas phase and covalent binding of the plasma-chemical activated at least one halogen-organic compound to the membrane surface;
        wherein the plasma-chemical activation is effected with an electron cyclotron resonance plasma (ECR); and
    in a second step, a wet-chemical modification of the functionalised membrane is effected by radical graft polymerisation.

2. The method according to claim 1, the at least one halogen-organic compound is selected from the group consisting of allyl halides, C1 to C8-alkylene halides, C1 to C8 alkyl halides, and mixtures thereof.

3. The method according to claim 1, wherein the covalent binding is effected via alkylene bridges and derivatives thereof.

4. The method according to claim 2, wherein the primary molecular functionalisation is effected in the gas phase at atmospheric pressure, a pressure range of 100 to 1,000 mbar, or in a vacuum in a pressure range of 0.01 to 100 mbar and at temperatures in the range of 20 to 150° C. but at most however up to the decomposition temperature of the polymer membrane layer.

5. The method according to claim 2, wherein the halogen atoms of the halogen-organic compounds are split photochemically or by catalytic effect.

6. The method according to claim 5, wherein starting from the covalently bonded halogen atoms, immobilised radicals are produced, based on which a radical graft polymerisation is started with alkenes.

7. The method according to claim 6, wherein oligomeric or polymeric substances grow, by radical graft polymerisation, beginning on functional groups bonded on the membrane surface and orientated away from the membrane surface.

8. The method according to claim 2, wherein the membrane surface to be modified consists of a material selected from the group consisting of polyamide, polyurethane, and a polyurea, or a composite thereof.

* * * * *